US009105132B2

(12) United States Patent
Thörn

(10) Patent No.: US 9,105,132 B2
(45) Date of Patent: Aug. 11, 2015

(54) REAL TIME THREE-DIMENSIONAL MENU/ICON SHADING

(75) Inventor: Karl Ola Thörn, Limhamn (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 993 days.

(21) Appl. No.: 13/239,923

(22) Filed: Sep. 22, 2011

(65) Prior Publication Data

US 2012/0105589 A1 May 3, 2012

Related U.S. Application Data

(60) Provisional application No. 61/407,997, filed on Oct. 29, 2010.

(30) Foreign Application Priority Data

Oct. 27, 2010 (EP) .................................... 10189132

(51) Int. Cl.
*G06T 15/20* (2011.01)
*G06T 19/00* (2011.01)

(52) U.S. Cl.
CPC .............. *G06T 15/20* (2013.01); *G06T 19/00* (2013.01); *G06T 2215/16* (2013.01)

(58) Field of Classification Search
CPC ...... G06T 15/20; G06T 19/00; G06T 2215/16
See application file for complete search history.

(56) References Cited

U.S. PATENT DOCUMENTS 8,314,832 B2 * 11/2012 Mann et al. ................. 348/51
2002/0145709 A1 * 10/2002 Shibasaki et al. ............ 353/122
2004/0119723 A1 * 6/2004 Inoue et al. .................. 345/619
2004/0180690 A1 * 9/2004 Song et al. ................ 455/556.1
2005/0104848 A1 * 5/2005 Yamaguchi et al. .......... 345/156
2007/0019000 A1 * 1/2007 Motomura et al. ........... 345/619
2008/0019576 A1 * 1/2008 Senftner et al. .............. 382/118

(Continued)

FOREIGN PATENT DOCUMENTS

EP  1 950 708 A1  7/2008
WO  0247395 A2    6/2002

OTHER PUBLICATIONS

European Search Report, corresponding to European application EP 10 18 9132, date of completion of search is Mar. 18, 2011.

*Primary Examiner* — Sath V Perungavoor
*Assistant Examiner* — Peter D Le
(74) *Attorney, Agent, or Firm* — Renner, Otto, Boisselle & Sklar, LLP.

(57) ABSTRACT

An image display apparatus, comprising: a two-dimensional display for displaying three-dimensional object images; an imaging unit for capturing an image of a user who is in the state of viewing the display screen; a processing unit for determining a face direction orientation of the user from the captured image; a tilt sensor for determining an angle of the image display apparatus; wherein the processing unit determines a virtual light direction by subtracting the angle of the image display apparatus from the face direction; and a projection image generator for projecting the three-dimensional objects onto the display, wherein lighting and shading is applied to the three-dimensional objects based on the virtual light direction is disclosed. A method for displaying three-dimensional images and a computer program for implementing the method are also disclosed.

12 Claims, 6 Drawing Sheets

(56) References Cited

U.S. PATENT DOCUMENTS

| | | | |
|---|---|---|---|
| 2008/0165195 A1* | 7/2008 | Rosenberg | 345/473 |
| 2008/0205712 A1* | 8/2008 | Ionita et al. | 382/118 |
| 2008/0300010 A1* | 12/2008 | Border et al. | 455/556.1 |
| 2009/0202114 A1* | 8/2009 | Morin et al. | 382/118 |
| 2009/0244097 A1* | 10/2009 | Estevez | 345/633 |
| 2010/0156907 A1 | 6/2010 | Vanderspek | |

* cited by examiner

REAL TIME THREE-DIMENSIONAL MENU/ICON SHADING

CROSS-REFERENCE TO RELATED APPLICATION

This application claims the benefit of U.S Provisional Patent Application Ser. No. 61/407,997, filed Oct. 29, 2010, the entire disclosure of which is hereby incorporated by reference.

TECHNICAL FIELD

The present invention generally relates to generating a three-dimensional image on a display screen. In particular, the present invention relates to how to light up and shade a three-dimensional icon on a display screen based on the position of the display screen and the user's head.

BACKGROUND

Throughout the years, display screens on mobile communication devices, such as mobile phones and PDAs, have evolved greatly. Currently, these display screens are capable of providing streaming video and dynamic user interface graphics. For example, three-dimensional icons are now being displayed on the two-dimensional display screens.

One way of creating a three-dimensional image or icon on a two-dimensional display screen is through the use of lighting and shading. One problem with this method for creating a three-dimensional image is that the lighting and shading is only correct when the user is looking at the display screen from a predetermined orientation, i.e., when the user is staring directly perpendicular to the display screen. Thus, there is a need for a method and apparatus for presenting three-dimensional images using lighting and shading based on whatever the orientation is between the user and the display screen.

SUMMARY

The present invention is based on using face detection technology and tilt sensors in a mobile terminal apparatus to determine the user's face orientation in respect to a display screen of the mobile terminal apparatus and generating lighting and shading of at least one three-dimensional image/icon based on the determined orientation.

According to a first aspect, there is provided a method for displaying three-dimensional objects in a mobile terminal apparatus that comprises an imaging unit and a display unit having a two-dimensional screen, comprising the steps of: capturing an image of a user who is in the state of viewing the display screen by the imaging unit; detecting from the image an orientation of the user's face and a face direction; detecting an angle of the mobile terminal apparatus; determining a virtual light direction by subtracting the angle of the mobile terminal apparatus from the face direction; and applying lighting and shading to the three dimensional objects on the screen based on the virtual light direction.

According to second aspect, there is provided an image display apparatus, comprising: a two-dimensional display for displaying three-dimensional object images; an imaging unit for capturing an image of a user who is in the state of viewing the display screen; a processing unit for determining a face direction orientation of the user from the captured image; a tilt sensor for determining an angle of the image display apparatus; wherein the processing unit determines a virtual light direction by subtracting the angle of the image display apparatus from the face direction; and a projection image generator for projecting the three-dimensional objects onto the display, wherein lighting and shading is applied to the three-dimensional objects based on the virtual light direction.

According to a third aspect, there is provide a computer program comprising instructions which when executed on a processor of a terminal apparatus cause the terminal apparatus to perform the method according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION OF PREFERRED EMBODIMENTS

Figure 1:
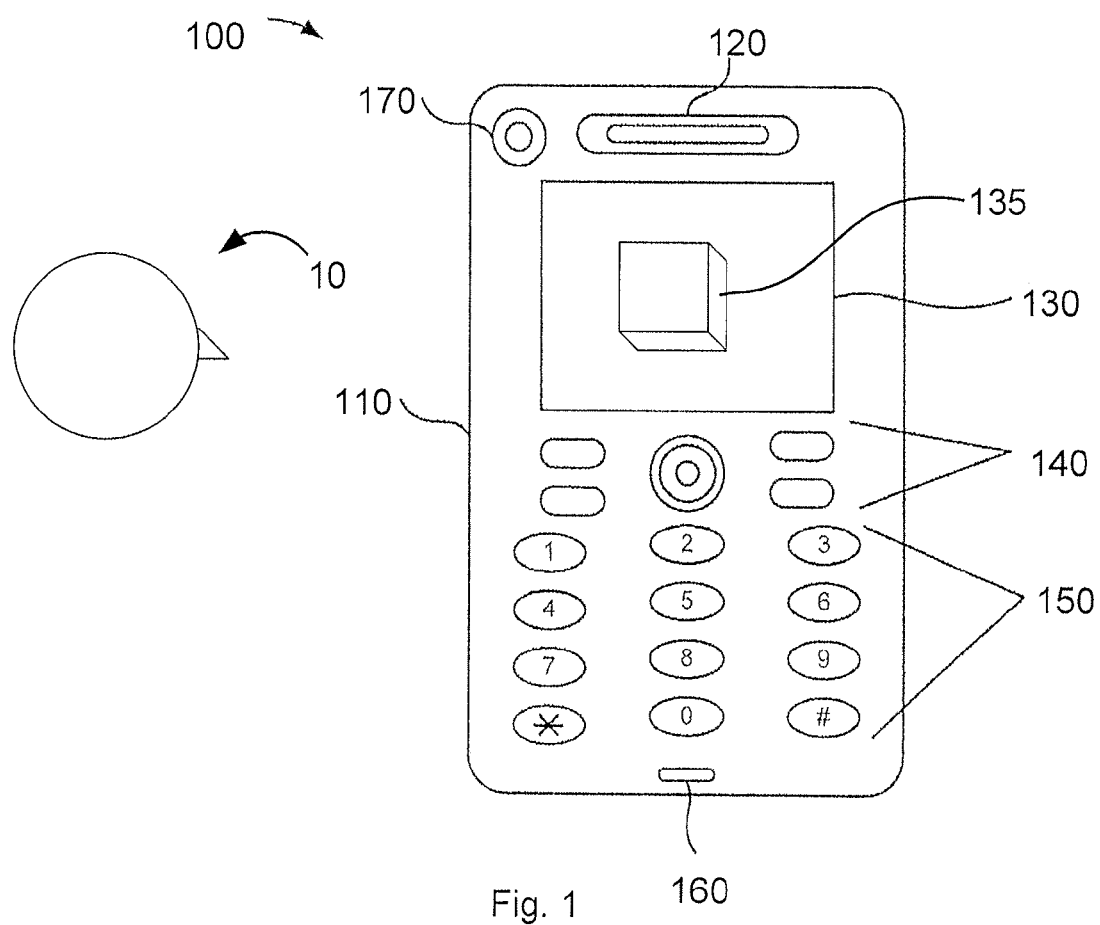
FIG. 1 schematically illustrates a mobile terminal apparatus according to one embodiment.

FIG. 1 is a diagram of a mobile terminal apparatus 100 according to an implementation consistent with principles of the invention. As shown in FIG. 1 the mobile terminal apparatus 100 may include, but is not limited to, a housing 110, a speaker 120, a display 130, control buttons 140, a keypad 150, a microphone 160, and an imaging unit 170. The housing 110 may support the components of the mobile terminal apparatus 100. The speaker 120 may provide audible information to the user of the mobile terminal apparatus 100. The display 130 may provide visual information to a user of the mobile terminal apparatus 100. For example, the display 130 may render media information, such as image frames and/or video, and/or function as a viewfinder in connection with the operation of the imaging unit 170. The control buttons 140 may permit the user to interact with the mobile terminal apparatus 100 to cause the mobile terminal apparatus 100 to perform one or more operations. The keypad 150 may include a standard telephone keypad and/or a touch screen. The microphone 160 may receive audible information from the user. The imaging unit 170 may enable the user to capture and store video and/or images.

Figure 2:
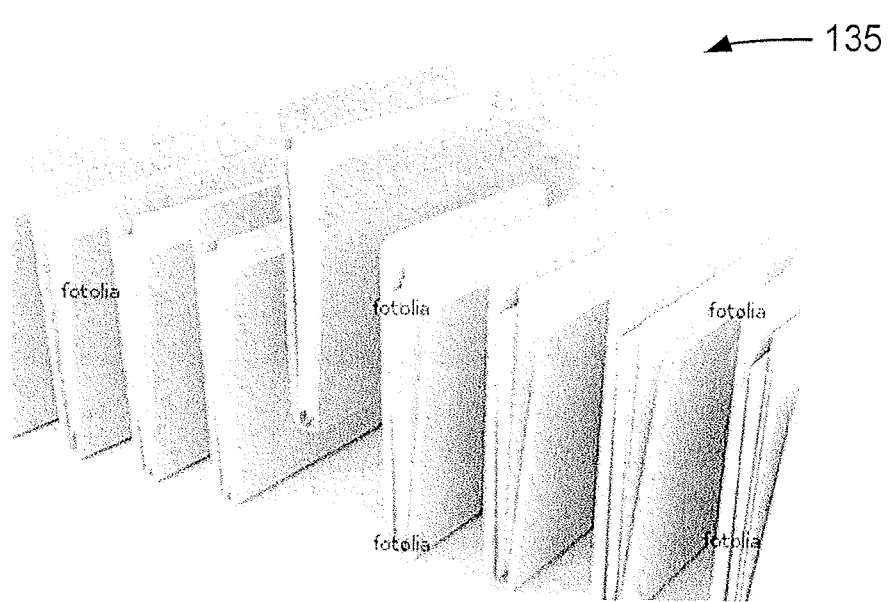
FIG. 2 illustrates an exemplary three-dimensional image/icon for display.

In operation according to some embodiments of the invention, the mobile terminal apparatus 100 includes the display screen 130 on which a three-dimensional (3D) object projection image, for example but not limited to menu item(s) or icon(s) 135 can be displayed. An example of a three-dimensional object projection image 135 is illustrated in FIG. 2. The imaging unit 170 is capable of obtaining an image of a face of the head 10 of a user who is viewing the display screen 130. The imaging unit 170 corresponds to a device such as a digital camera that captures the image of the user who is in a state of viewing the display screen 130 according to one embodiment of the invention.

Figure 3:
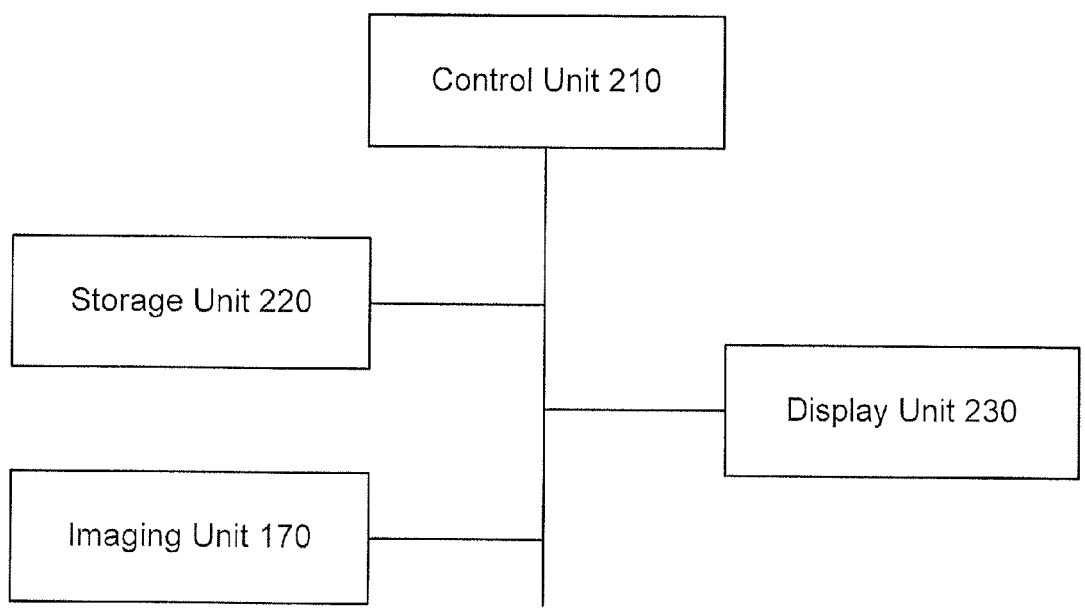
FIG. 3 illustrates the structure of hardware in the mobile terminal apparatus according to one embodiment.

FIG. 3 illustrates the structure of hardware in the mobile terminal apparatus 100 according to one embodiment of the invention. The mobile terminal apparatus 100 includes a processing unit 210, a storage unit 220, a display unit 230. The processing unit 210 is a part that constitutes a controller in the embodiment of the present invention. The processing unit 210 controls the entire mobile terminal apparatus 100 and performs various processes by executing various programs. The storage unit 220 stores programs executed by the processing unit 210 and necessary data. The storage unit 220 may include not only an internal storage device such as a ROM, a RAM, a flash memory, and an HDD but also a removable recording medium. The storage unit 220 also stores three-dimensional object information and captured image information obtained as a result of capturing an image. The display unit 230 displays the three-dimensional object projection image, on the display screen 130. The display unit 230 includes a display device such as an LCD, an organic EL display, and the like.

Figure 4:
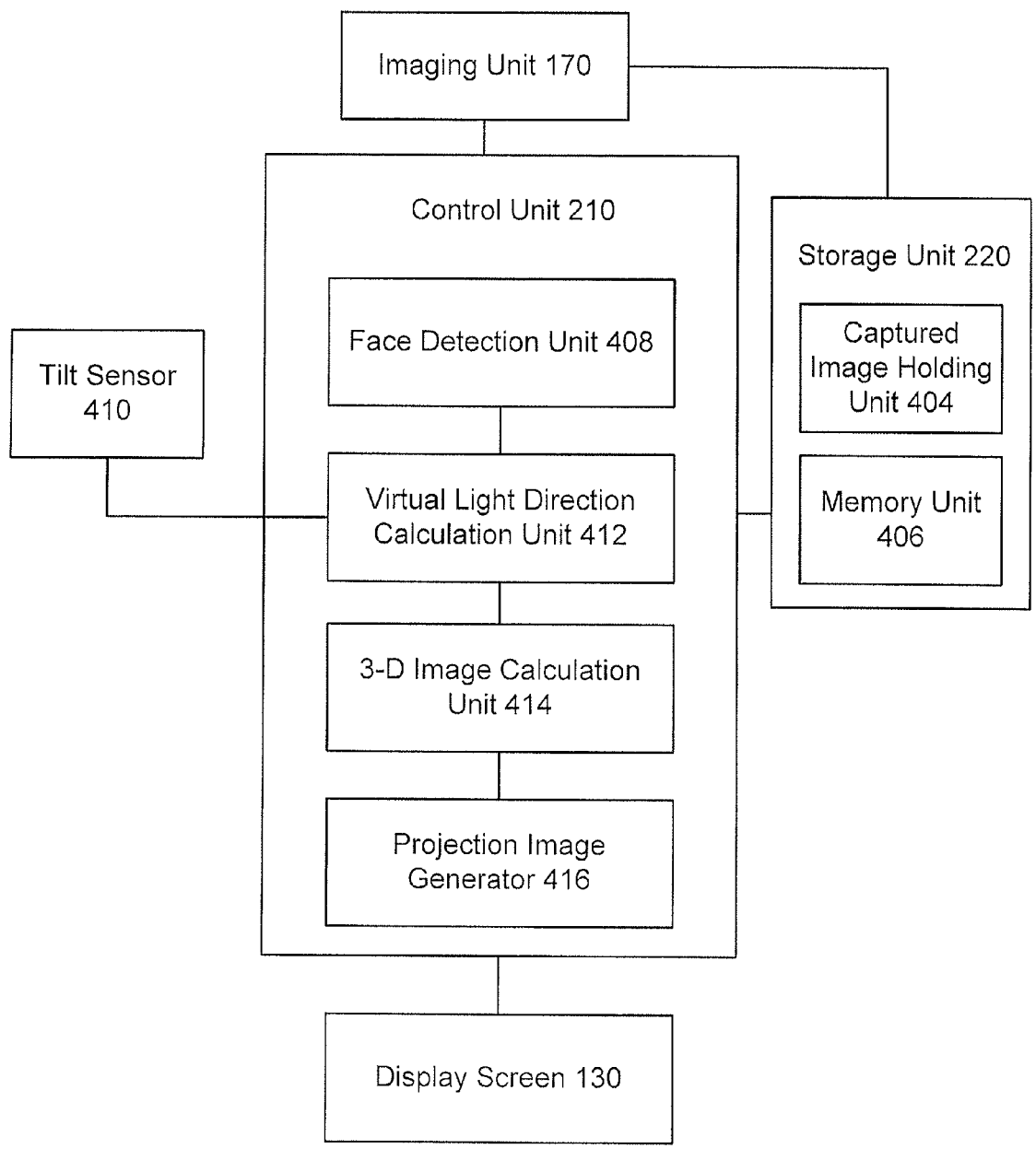
FIG. 4 illustrates a functional block diagram showing main functions of the mobile terminal apparatus according to one embodiment.
Figure 5:
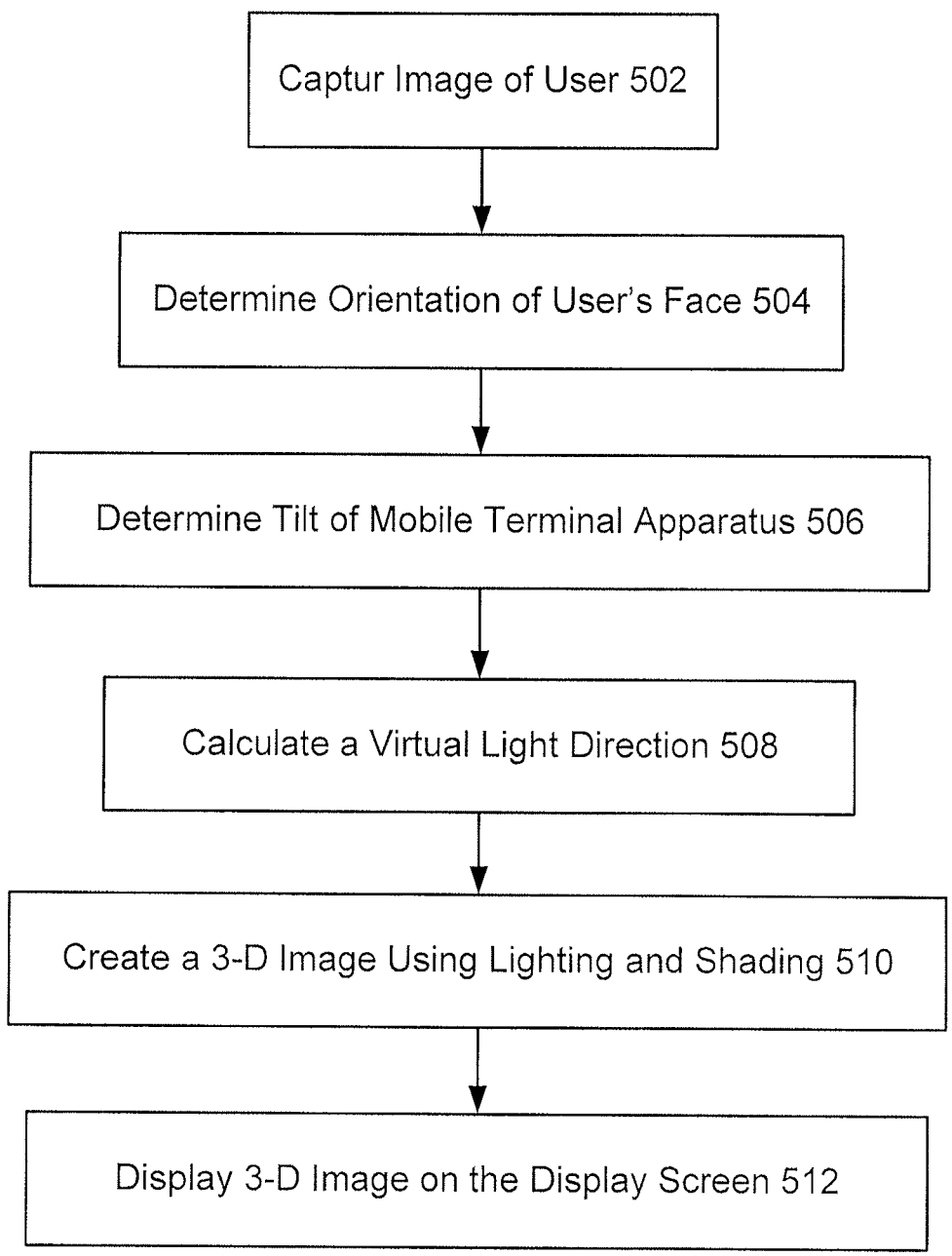
FIG. 5 is a flow chart illustrating a method of creating a three-dimensional image according to one embodiment of the invention.

One embodiment of the invention will now be described with reference to FIGS. 4-5. In step 502, the control unit 210 commands the imaging unit 170 to take a picture. The picture is taken of the user who is in a state of viewing the display screen 130. The image is stored in a captured image holding unit 404 in the storage unit 220. In step 504, a face detection unit 408 in the control unit 210 takes the captured image and applies face detection techniques to the captured image. By using the face detection techniques, the orientation of the users face (face direction) can be determined.

In step 506, a tilt sensor unit 410, for example, accelerometer/gyroscope, operatively connected to the control unit 210, determines the tilt angle of the mobile terminal apparatus 100 using. A virtual light direction calculation unit 412 uses the calculated face direction and the tilt angle of the mobile terminal apparatus 100 to calculate a virtual light direction in step 508. For example, the virtual light direction unit 412 may subtract the tilt angle of the mobile terminal apparatus 100 from the face direction to create the virtual light direction information. The calculated virtual light direction information is stored in a memory unit 406. The virtual light direction can be thought of as a virtual light shining from the users face to the display screen 130. In order for the three-dimensional images displayed on the display screen to look correct to the user, the lighting and shading of the three-dimensional image must be applied to the image to correspond to the direction of the virtual light direction. The virtual light direction information is thus used by a three-dimensional image calculation unit 414 to determine how the lighting and shading should be applied to create at least one three-dimensional image to be displayed on the display screen 130 in step 510.

The three-dimensional image, menu item or icon, etc may be designed in 3D either as models or using bump maps, reflection maps, uv maps, or displacement maps applied to the images, i.e reflection/scattering and shading used to describe the appearance of a surface of an object, icon, or menu etc.

Figure 6:
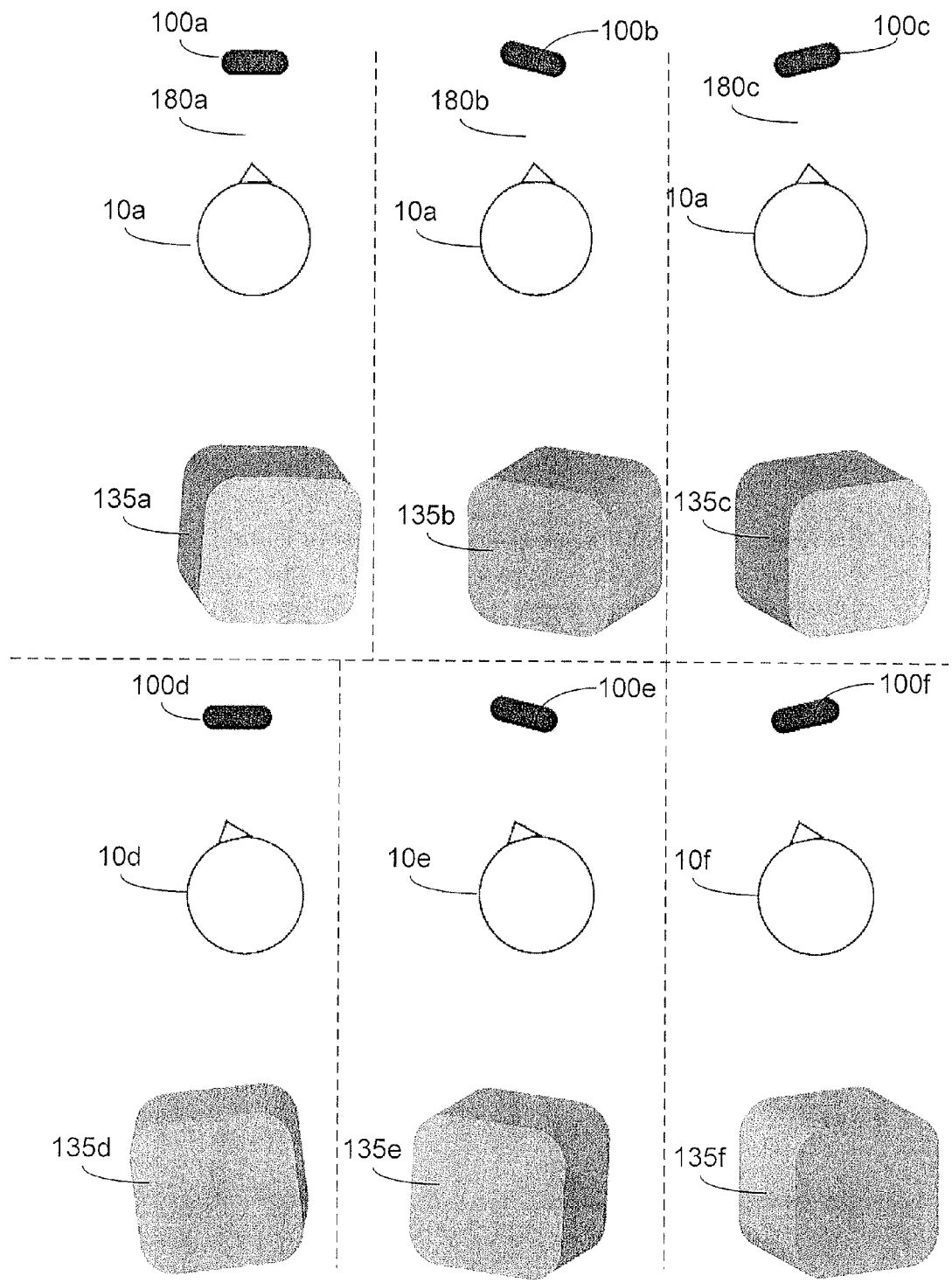
FIG. 6 illustrates exemplary head and mobile terminal apparatus orientations according to one embodiment of the invention.

The three-dimensional information is then sent to a projection image generator 416 for projecting the at least one three-dimensional image on the display screen 130. It can be displayed as a two-dimensional (2D) image through 3D rendering. Examples of various head orientations 10a, 10d, 10e, and 10f and mobile terminal apparatus orientations 100a-100f and the generated results 135a-135f of the object projection image 135 as displayed on the display screen 130 in response to a virtual beam of light 180 are illustrated in FIG. 6. It will be understood by one skilled in the art that the process described in FIG. 5 can be repeated at regular intervals so as to maintain the correct orientation of the displayed three-dimensional image(s) as the orientation of the user's head and the tilt angle of the mobile terminal apparatus changes with time.

The described embodiments of the invention and their equivalents may be realized in software or hardware or a combination thereof. They may be performed by general-purpose circuits associated with or integral to a communication device or other consumer product, such as digital signal processors (DSP), central processing units (CPU), co-processor units, field-programmable gate arrays (FPGA) or other programmable hardware, or by specialized circuits such as application-specific integrated circuits (ASIC). All such forms are contemplated to be within the scope of the invention.

The invention may be embodied within an electronic apparatus, such as the mobile terminal apparatus, comprising circuitry/logic or performing methods according to any of the embodiments of the invention. The electronic apparatus may, for example, be a portable or handheld mobile radio communication equipment, a mobile radio terminal, a mobile telephone, a communicator, an electronic organizer, a smartphone, a notebook, a mobile gaming device, or a digital camera.

The methods according to the present invention is suitable for implementation with aid of processing means, such as computers and/or processors, especially since the case with all imaging apparatuses in question have such processing capabilities. Further especially, the feature of pattern recognition is particularly suitable to be performed in an Image Signal Processor (ISP) hardware or other dedicated hardware.

Figure 7:
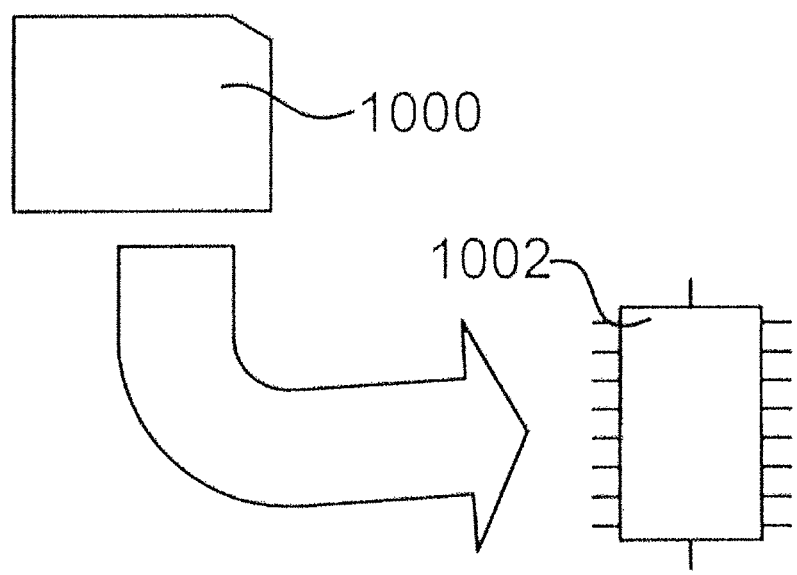
FIG. 7 schematically illustrates a computer readable medium and a processing device, wherein a computer program is stored on the computer readable medium, the computer program comprising instructions which when executed on the processor of a mobile terminal apparatus cause the method of FIG. 5.

Therefore, there is provided computer programs, comprising instructions arranged to cause the processing means, processor, or computer to perform the steps of any of the methods according to any of the embodiments described with reference to FIG. 5. The computer programs preferably comprises program code which is stored on a computer readable medium 1000, as illustrated in FIG. 7, which can be loaded and executed by a processing means, processor, or computer 1002 to cause it to perform the methods, respectively, according to embodiments of the present invention, preferably as any of the embodiments described with reference to FIG. 5. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 7 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for displaying three-dimensional objects in a mobile terminal apparatus that comprises an imaging unit and a display unit having a two-dimensional screen, comprising the steps of:
    capturing an image of a user who is in the state of viewing the display screen by the imaging unit;
    detecting from the image an orientation of the user's face and a face direction;
    detecting a yaw angle of the mobile terminal apparatus about an axis parallel to a surface of the display unit;
    determining a virtual light direction by subtracting the yaw angle of the mobile terminal apparatus from the face direction; and
    applying lighting and shading to the three dimensional objects on the screen based on the virtual light direction.

2. The method according to claim 1, wherein a face detection algorithm is used to determine the face direction from the captured image.

3. The method according to claim 1, wherein the three-dimensional objects are designed as models.

4. The method according to claim 1, wherein the three-dimensional objects are designed using bumpmaps.

5. An image display apparatus, comprising:
    a two-dimensional display for displaying three-dimensional object images;
    an imaging unit for capturing an image of a user who is in the state of viewing the display screen;
    a processing unit for determining a face direction orientation of the user from the captured image;
    a tilt sensor for determining a yaw angle of the image display apparatus about an axis parallel to a surface of the two-dimensional display;
    wherein the processing unit determines a virtual light direction by subtracting the yaw angle of the image display apparatus from the face direction; and
    a projection image generator for projecting the three-dimensional objects onto the display, wherein lighting and shading is applied to the three-dimensional objects based on the virtual light direction.

6. The image display apparatus according to claim 5, wherein a face detection algorithm is used to determine the face direction from the captured image.

7. The image display apparatus according to claim 5, wherein the three-dimensional objects are designed as models.

8. The image display apparatus according to claim 5, wherein the three-dimensional objects are designed using bumpmaps.

9. The image display apparatus according to claim 5, wherein the image display apparatus is in a mobile terminal apparatus.

10. The image display apparatus according to claim 5, wherein the mobile terminal apparatus is a mobile phone.

11. A non-transitory computer-readable medium comprising computer executable instructions which when executed on a processor of a terminal apparatus cause the terminal apparatus to perform the method according to claim 1.

12. The method according to claim 1, wherein detecting an angle of the mobile terminal apparatus includes using a tilt sensor operatively coupled to the mobile terminal apparatus.

* * * * *